(12) United States Patent
Christenson et al.

(10) Patent No.: US 9,124,519 B2
(45) Date of Patent: *Sep. 1, 2015

(54) SYSTEM GUIDED SURROGATING CONTROL IN BROADCAST AND MULTICAST

(71) Applicant: LENOVO ENTERPRISE SOLUTIONS (SINGAPORE) PTE. LTD., Singapore (SG)

(72) Inventors: David A. Christenson, Fergus Falls, MN (US); Josep Cors, Rochester, MN (US); Ward R. Nelson, Stewartville, MN (US); Jun C. Yin, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 27 days.

This patent is subject to a terminal disclaimer.

(21) Appl. No.: 13/834,322

(22) Filed: Mar. 15, 2013

(65) Prior Publication Data
US 2014/0269685 A1 Sep. 18, 2014

Related U.S. Application Data

(63) Continuation of application No. 13/804,074, filed on Mar. 14, 2013.

(51) Int. Cl.
  *H04L 12/947* (2013.01)
  *H04L 12/931* (2013.01)

(52) U.S. Cl.
  CPC .............. *H04L 49/25* (2013.01); *H04L 49/20* (2013.01)

(58) Field of Classification Search
  None
  See application file for complete search history.

(56) References Cited

U.S. PATENT DOCUMENTS

| | | | |
|---|---|---|---|
| 5,790,546 A * | 8/1998 | Dobbins et al. | 370/400 |
| 6,331,983 B1 * | 12/2001 | Haggerty et al. | 370/400 |
| 7,493,562 B2 | 2/2009 | Kui et al. | |
| 7,720,076 B2 * | 5/2010 | Dobbins et al. | 370/395.53 |
| 7,864,769 B1 | 1/2011 | Woo et al. | |
| 7,925,802 B2 * | 4/2011 | Lauterbach et al. | 710/38 |
| 2003/0033577 A1 * | 2/2003 | Anderson | 716/1 |
| 2007/0189288 A1 * | 8/2007 | Andrews et al. | 370/390 |
| 2009/0222530 A1 * | 9/2009 | Buford et al. | 709/217 |
| 2011/0261815 A1 | 10/2011 | Armstrong et al. | |
| 2013/0242992 A1 * | 9/2013 | Basso et al. | 370/390 |

OTHER PUBLICATIONS

U.S. Appl. No. 13/804,074, entitled System Guided Surrogating Control in Broadcast and Multicast, filed Mar. 14, 2013.

* cited by examiner

*Primary Examiner* — Hicham Foud
(74) *Attorney, Agent, or Firm* — Patterson & Sheridan, LLP

(57) ABSTRACT

Method to assist in distribution of packets between a plurality of switch elements in a distributed switch, by monitoring an attribute of each of the plurality of switch elements including a first switch element and a first surrogate switch element, the first surrogate switch element in a first level of a hierarchy and configured using a default hierarchy configuration. The default hierarchy configuration forwards a data frame to at least one of: a destination switch element of the data frame, and a second surrogate switch element. The second surrogate switch element is in a second hierarchy level. A score is computed based on the monitored attribute for each of the switch elements. Upon determining the score of the first switch element is greater than the score of the first surrogate switch element, the first switch element is designated as the first surrogate switch element.

6 Claims, 7 Drawing Sheets

SYSTEM GUIDED SURROGATING CONTROL IN BROADCAST AND MULTICAST

CROSS-REFERENCE TO RELATED APPLICATIONS

This application is a continuation of co-pending U.S. patent application Ser. No. 13/804,074, filed Mar. 14, 2013. The aforementioned related patent application is herein incorporated by reference in its entirety.

BACKGROUND

Embodiments disclosed herein relate to the field of computer software. More specifically, embodiments disclosed herein relate to computer software which provides system guided surrogating control in broadcast and multicast.

SUMMARY

Embodiments disclosed herein provide a method, computer program product, and system to assist in distribution of packets between a plurality of switch elements in a distributed switch, by monitoring an attribute of each of the plurality of switch elements including a first switch element and a first surrogate switch element, the first surrogate switch element being in a first level of a hierarchy and is configured using a default hierarchy configuration, the default hierarchy configuration forwarding a data frame to at least one of: (i) a destination switch element of the data frame, and (ii) a second surrogate switch element, the second surrogate switch element being in a second level of the hierarchy; computing an attribute score, based on the monitored attribute, for each of the switch elements; and upon determining that the attribute score of the first switch element is greater than the attribute score of the first surrogate switch element, designating the first switch element as the first surrogate switch element.

DETAILED DESCRIPTION

Figure 1:
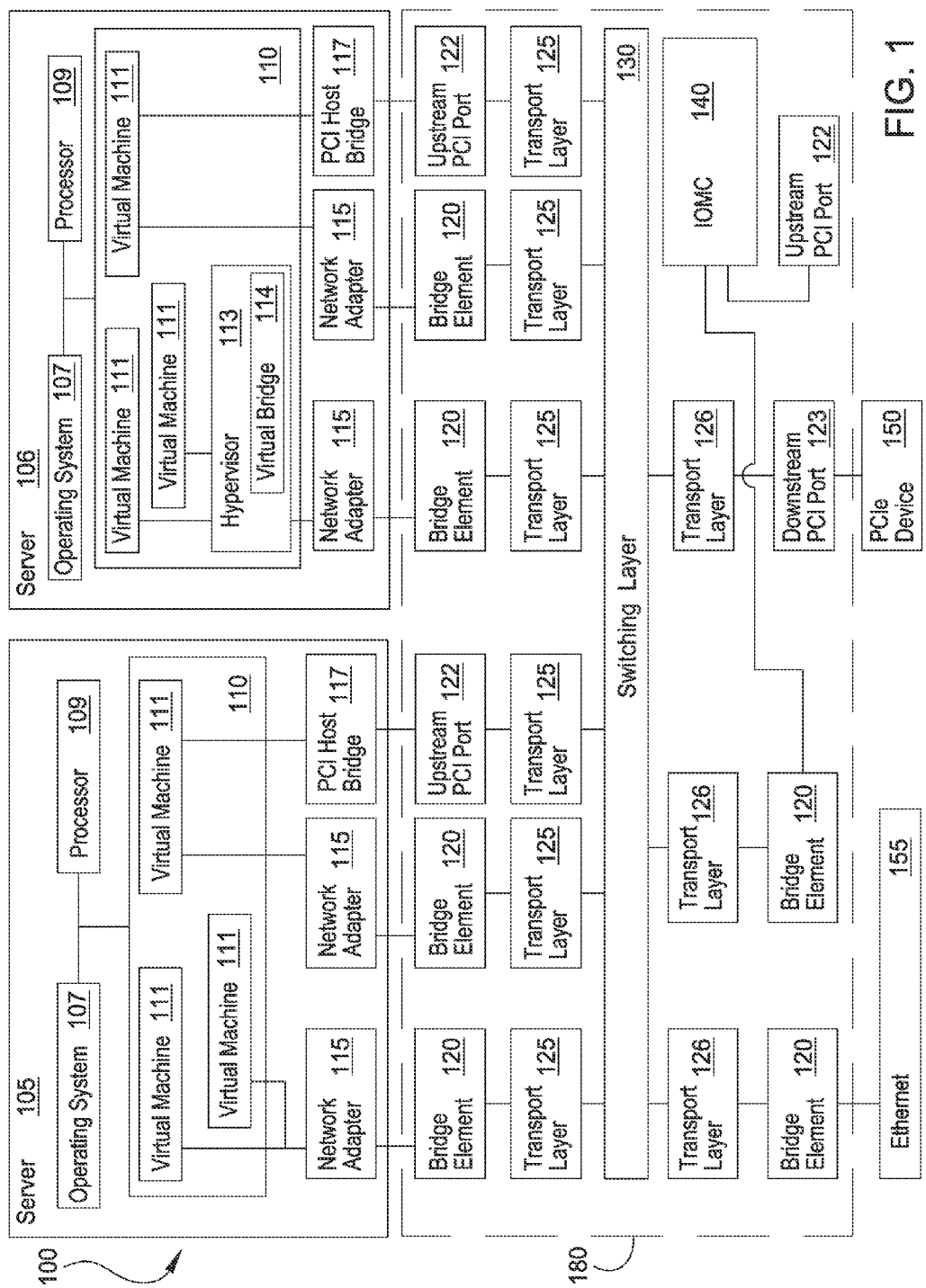
FIG. 1 illustrates a system architecture that includes a distributed, virtual switch, according to one embodiment described herein.

In a distributed, virtual switch, the hardware infrastructure may use multicast/broadcast surrogates to replicate packets in a tree structure to reach the destination ports across the entire system. The hardware infrastructure may provide different surrogating levels, each providing an increased ability to distribute multicast/broadcast packets. Embodiments disclosed herein provide a software management system which fully leverages the hardware capability to ensure this surrogating works well during run-time by dynamically adjusting the surrogating to achieve optimal performance when sending frames to destination ports. To do so, embodiments disclosed herein may dynamically switch a surrogate node from a first node to a second node, upon determining that the performance statistics of the second node would provide better performance when transmitting packets. The statistics may include monitoring a waiting time between the frames traversal from an ingress port to an egress port of the surrogate node, a nodal bandwidth, and a nodal throughput. Additionally, embodiments disclosed herein may dynamically adjust the surrogate level in order to improve performance. If a system administrator chooses a fixed surrogate level without constantly tuning it, undesirable results may occur. Routing frames to an excessive number of ports with a lower surrogate level may cause low bandwidth and poor performance. Routing frames to inadequate numbers of ports with a higher surrogate level may result in unnecessary overhead. The surrogate level may be adjusted based on monitored performance statistics which indicate improved performance would be achieved by adjusting the surrogate level. Adjusting the surrogate level may include routing frames to a greater or fewer number of local ports, or routing frames to a greater or fewer number of surrogate nodes.

A distributed, virtual switch may appear as a single switch element to a computing system (e.g., a server) connected to the distributed switch. In reality, the distributed switch may include a plurality of different switch modules that are interconnected via a switching layer such that each of the switch modules may communicate with any other of the switch modules. For example, a computing system may be physically connected to a port of one switch module but, using the switching layer, is capable of communicating with a different switch module that has a port connected to a WAN (e.g., the Internet). Moreover, each of the switch modules may be configured to accept and route data based on two different communication protocols. To the computing system, however, the two separate switch modules appear to be one single switch.

The distributed switch may include a plurality of chips (i.e., sub-switches) on each switch module. These sub-switches may receive a multicast data frame (e.g., an Ethernet frame) that designates a plurality of different destination sub-switches. The sub-switch that receives the data frame is responsible for creating copies of a portion of the frame, such as the frame's payload, and forwarding that portion to the respective destination sub-switches using the fabric of the distributed switch.

These sub-switches may be arranged in a hierarchical structure where one or more sub-switches are selected to act as surrogates. The sub-switches of the distributed switch are grouped together where each group is assigned to one or more of the surrogates. When a sub-switch receives a multicast data frame, it forwards the packet to one of the surrogate sub-switches. Each surrogate sub-switch may then forward the packet to another surrogate or a destination computing device. Because the surrogates may also transmit the packets in parallel using two or more connection interfaces, the bandwidth used to forward the multicast packet increases for each surrogate used.

Further, the surrogate hierarchy may include a plurality of levels that form a pyramid-like arrangement where upperlevel surrogates forward the multicast data frame to lower-level surrogates until the bottom of the hierarchy is reached. Each multicast group may be customized to use one or more of these levels when forwarding the multicast data through the distributed switch.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a system architecture that includes a distributed virtual switch, according to one embodiment described herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may be considered to include memory storage physically located in the server 105 or on another computing device coupled to the server 105.

The server 105 may operate under the control of an operating system 107 and may execute various computer software applications, components, programs, objects, modules, and data structures, such as virtual machines 111.

The server 105 may include network adapters 115 (e.g., converged network adapters). A converged network adapter may include single root I/O virtualization (SR-IOV) adapters such as a Peripheral Component Interconnect Express (PCIe)

adapter that supports Converged Enhanced Ethernet (CEE). Another embodiment of the system 100 may include a multi-root I/O virtualization (MR-IOV) adapter. The network adapters 115 may further be used to implement of Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge 117 would then connect to an upstream PCI port 122 on a switch element in the distributed switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames received by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed switch 180.

The distributed virtual switch 180, in general, includes a plurality of bridge elements 120 that may be located on a plurality of a separate, though interconnected, hardware components. To the perspective of the network adapters 115, the switch 180 acts like one single switch even though the switch 180 may be composed of multiple switches that are physically located on different components. Distributing the switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect with dedicated connections which connect bridge elements 120 located within the same chassis and rack, as well as links for connecting to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

Although "upstream" and "downstream" are used to describe the PCI ports, this is only used to illustrate one possible data flow. For example, the downstream PCI port 123 may in one embodiment transmit data from the connected to the PCIe device 150 to the upstream PCI port 122. Thus, the PCI ports 122, 123 may both transmit as well as receive data.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special-purpose processor) is coupled to at least one bridge element 120 or upstream PCI port 122 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

Figure 2:
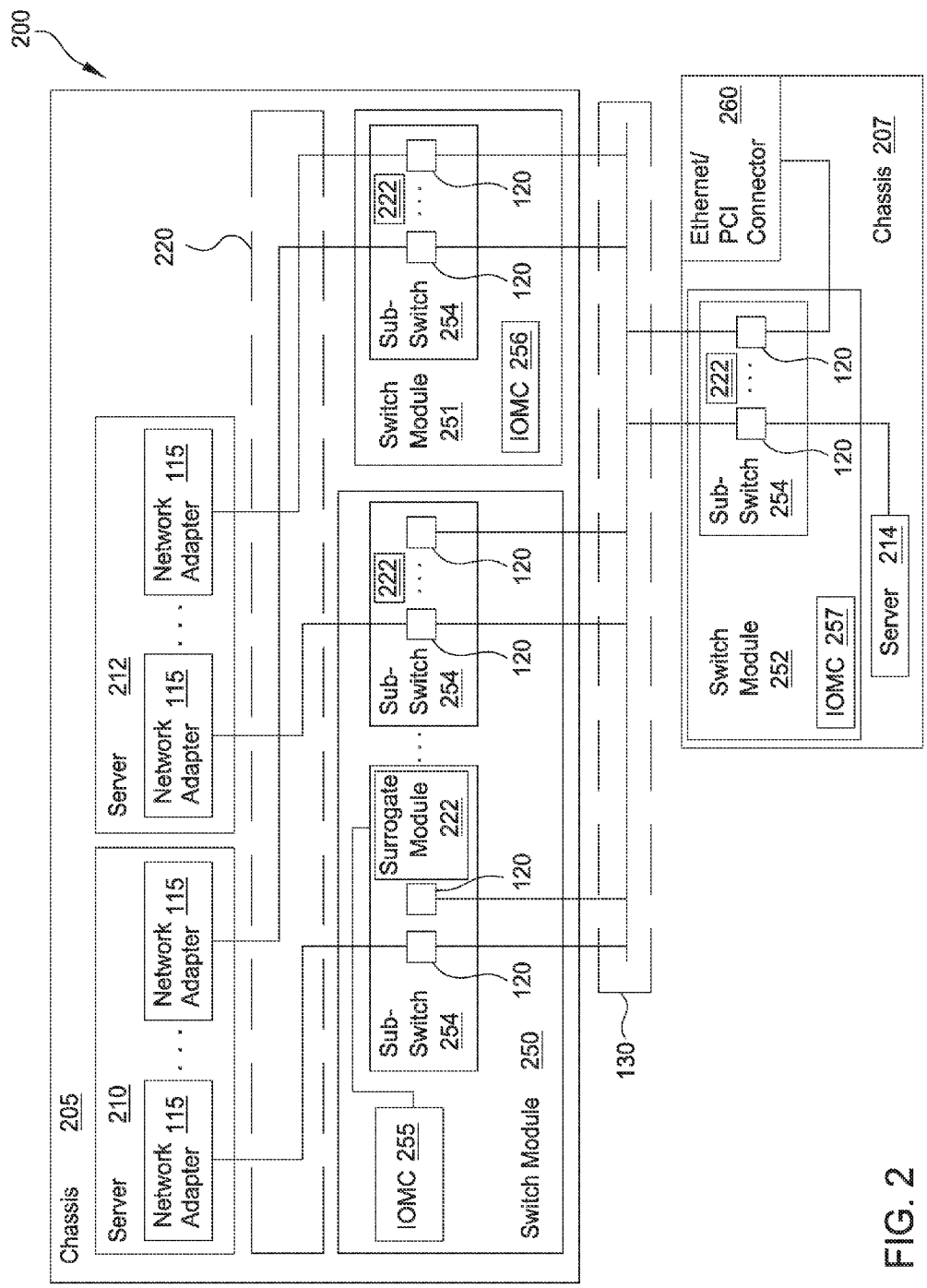
FIG. 2 illustrates the hardware representation of a system that implements a distributed, virtual switch, according to one embodiment described herein.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254 (i.e., a microchip). In one embodiment, the switch modules 250, 251, 252 are hardware components (e.g., PCB boards, FPGA boards, etc.) that provide physical support and connectivity between the network adapters 115 and the bridge elements 120. In general, the switch modules 250, 251, 252 include hardware that connects different chassis 205, 207 and servers 210, 212, 214 in the system 200 and may be a single, replaceable part in the computing system.

The switch modules 250, 251, 252 (e.g., a chassis interconnect element) include one or more sub-switches 254 and an IOMC 255, 256, 257. The sub-switches 254 may include a logical or physical grouping of bridge elements 120—e.g., each sub-switch 254 may have five bridge elements 120. Each bridge element 120 may be physically connected to the servers 210, 212. For example, a bridge element 120 may route data sent using either Ethernet or PCI communication protocols to other bridge elements 120 attached to the switching layer 130 using the routing layer. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module. As discussed above, the IOMCs 255, 256, 257 are attached to at least one sub-switch 254 (or bridge element 120) in each switch module 250, 251, 252 which enables each IOMC to route commands on the switching layer 130. For clarity, these connections for IOMCs 256 and 257 have been omitted. Moreover, switch modules 251, 252 may include multiple sub-switches 254.

As shown, each sub-switch 254 contains a surrogate module 222, which includes logic configured to dynamically modify surrogate nodes and surrogating levels. For example, the surrogate module 222 may monitor performance statistics of a plurality of attributes related to the performance of each sub-switch 254 in the distributed switch, and compute an attribute score for each sub-switch. If the surrogate module 222 identifies a first sub-switch 254 that may provide superior performance to a second sub-switch 254, currently designated as a surrogate node, based on the respective attribute scores, the surrogate module 222 may designate the first sub-switch 254 as the surrogate node. Additionally, the surrogate module 222 may monitor transfer times of multicast packets throughout a surrogate hierarchy. If the surrogate module 222 determines that the transfer times and attribute scores indicate that greater performance may be achieved by altering the surrogating levels, the surrogate module 222 may alter the surrogating level for a particular sub-switch 254.

The dotted line in chassis 205 defines the midplane 220 between the servers 210, 212 and the switch modules 250, 251. That is, the midplane 220 includes the data paths (e.g., conductive wires or traces) that transmit data between the network adapters 115 and the sub-switches 254.

Each bridge element 120 connects to the switching layer 130 via the routing layer. In addition, a bridge element 120 may also connect to a network adapter 115 or an uplink. As used herein, an uplink port of a bridge element 120 provides a service that expands the connectivity or capabilities of the system 200. As shown in chassis 207, one bridge element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridge elements 120 to update the routing tables and lookup tables to include the hardware elements on the new switching module.

Figure 3:
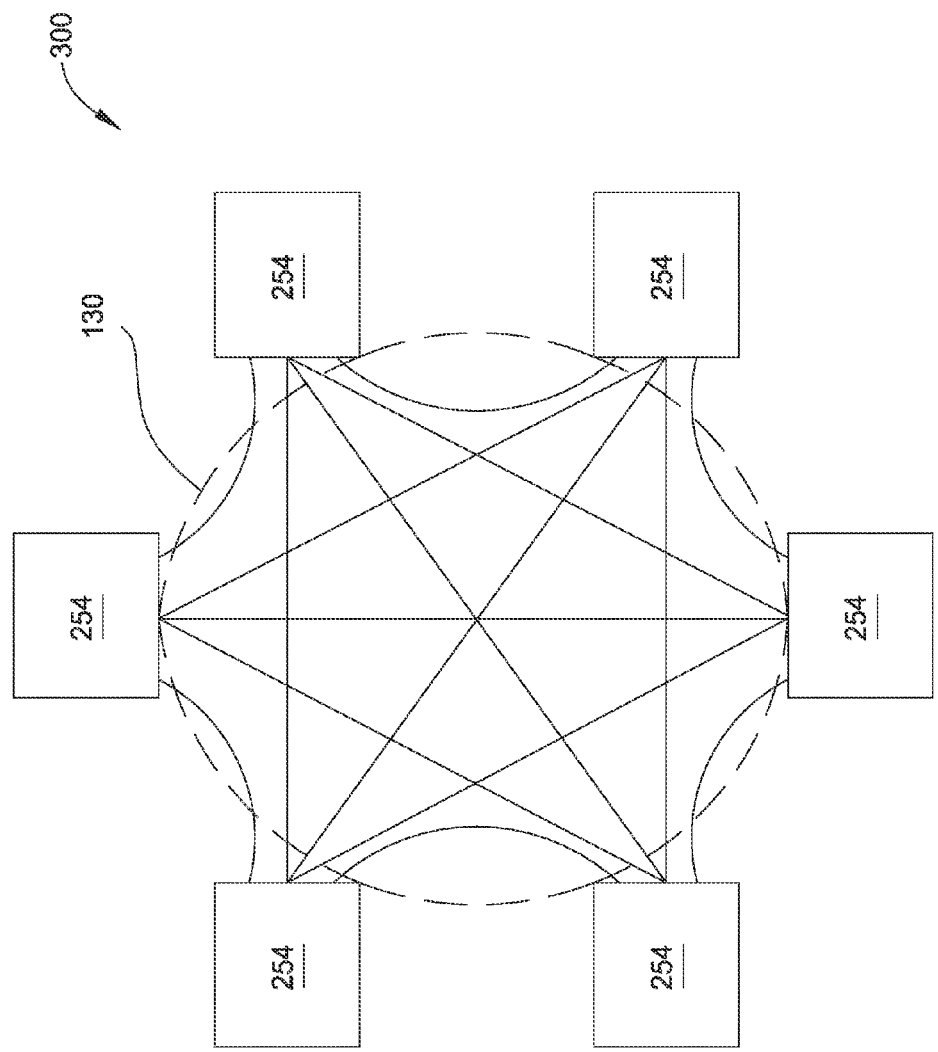
FIG. 3 illustrates a distributed, virtual switch, according to one embodiment described herein.

FIG. 3 illustrates a virtual switching layer, according to one embodiment described herein. Each sub-switch 254 in the systems 100 and 200 are connected to each other using the switching layer 130 via a mesh connection schema. That is, no matter the sub-switch 254 used, a cell (i.e., data packet) can be routed to another other sub-switch 254 located on any other switch module 250, 251, 252. This may be accomplished by directly connecting each of the bridge elements 120 of the sub-switches 254—i.e., each bridge element 120 has a dedicated data path to every other bridge element 120. Alternatively, the switching layer 130 may use a spine-leaf architecture where each sub-switch 254 (i.e., a leaf node) is attached to at least one spine node. The spine nodes route cells received from the sub-switch 254 to the correct spine node which then forwards the data to the correct sub-switch 254. However, this invention is not limited to any particular technique for interconnecting the sub-switches 254.

Figure 4:
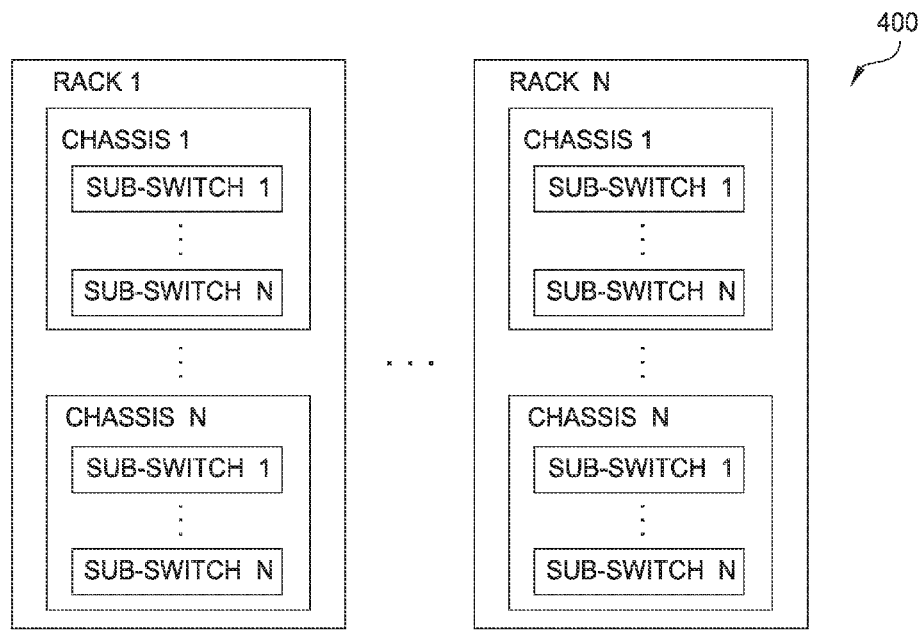
FIG. 4 is a computing system that is interconnected using the distributed switch, according to one embodiment disclosed herein.

FIG. 4 is a computing system 400 that is interconnected using the distributed switch, according to one embodiment disclosed herein. The computing system 400 includes one or more racks (Racks 1-N) that each contain one or more chassis (Chassis 1-N). To facilitate the communication between the different computing devices that may be contained in the chassis 1-N, the computing system 400 may use a plurality of sub-switches 1-N. Specifically, the distributed switch 180 shown in FIGS. 1-2 may be used to interconnect a plurality of different computing devices in the system 400. For clarity, only the sub-switches are illustrated. In one embodiment, each of the sub-switches is connected to each of the other sub-switches. That is, each of the sub-switches has at least one wire directly connecting it to every other sub-switch, even if that sub-switch is on a different rack. Nonetheless, this design is not necessary to perform the embodiments disclosed herein.

Figure 5:
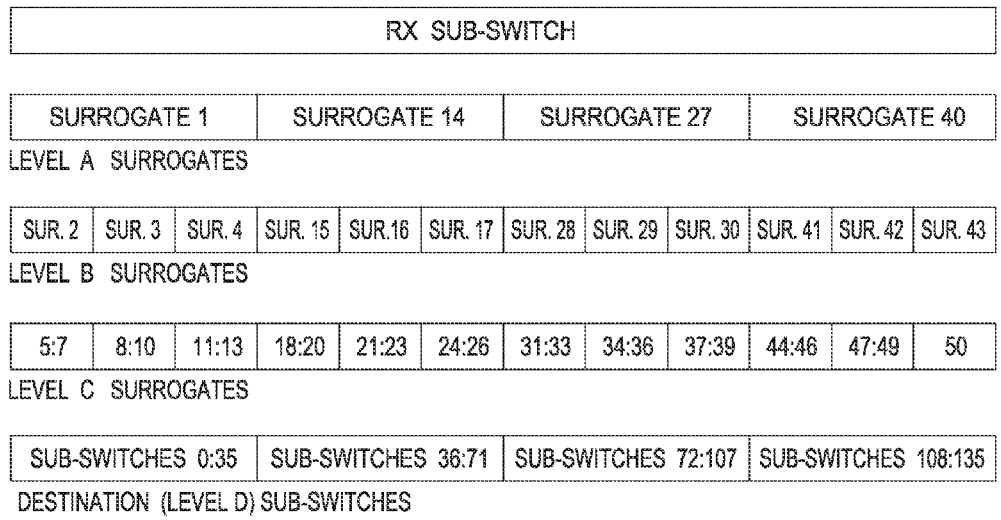
FIG. 5 is a hierarchy of surrogates for forwarding multicast data frames, according to one embodiment disclosed herein

FIG. 5 is a hierarchy 500 of surrogates for forwarding multicast data frames, according to one embodiment disclosed herein. To scale bandwidth, the computer system 400 may establish a hierarchy. As shown, the hierarchy 500 is established for a distributed switch that has 136 different sub-switches where each sub-switch has eight connection interfaces. The eight connection interfaces may be used to forward traffic to a bridge element located on the sub-switch, i.e., local bridge elements, or to a surrogate sub-switch. The hierarchy 500 is divided into four levels (excluding the Rx sub-switch that received the multicast data frame). All of the sub-switches in the distributed switch may be divided into four groups. However, the levels of the hierarchy 500 and the number of number of groups is arbitrary and may be dependent upon, for example, the total number of sub-switches, number of ports/connection interfaces on the sub-switches, and the architecture of the sub-switches. For example, a distributed switch with only 20 sub-switches may need a hierarchy with only one level of surrogates. Conversely, if each sub-switch has 135 ports with which it could forward the packet in parallel, then the hierarchy may not be needed. Instead, the sub-switches could use the necessary number of ports to forward a multicast data frame up to 135 sub-switches in parallel. Using the hierarchy 500, however, may reduce costs by allowing the distributed switch to accommodate greater number of sub-switches as well as increase bandwidth without having to use sub-switches with more ports.

The hierarchy 500 is illustrated such that sub-switches are assigned to a plurality of surrogates. The Level A surrogates—i.e., the top-level of the hierarchy 500—have four chosen surrogate sub-switches, or more specifically, four surrogate bridge elements that may or may not be located on different sub-switches. Each of the Level A surrogates are assigned a group of the sub-switches. This group is defined by the sub-switches that are directly below the box containing the Level A surrogate in FIG. 5. That is, Level A surrogate 1 is assigned to sub-switches 0:35, surrogate 14 is assigned to sub-switches 36:71, and so on. Accordingly, when the receiving sub-switch (i.e., RX sub-switch) receives a multicast data frame, it uses a multicast (MC) group table that identifies the members of the MC group. From this information, the RX sub-switch identifies which of the sub-switches 0:135 need to receive the data frame. If the membership includes a sub-switch in the group 0:35, the RX sub-switch forwards the data frame to surrogate 1. If none of the sub-switches in 0:35 are in the MC group's membership, then the RX sub-switch does not forward the data frame to surrogate 1.

Assuming that at least one of the sub-switches 0:35 is a member of the MC group, a similar analysis may be performed when the packet is received at surrogate 1. The surrogate 1 sub-switch looks up the group membership and determines which one of the Level B surrogates should receive the packet. The Level B surrogates 2-4 are assigned to a subset of the sub-switches assigned to Level A surrogate 1. That is, the surrogate 2 sub-switch is assigned to sub-switches 0:11, surrogate 3 is assigned to sub-switches 12:23, and surrogate 4 is assigned to sub-switches 14:35. If the group membership includes sub-switches in each of these three groups, then surrogate 1 forwards a copy of the packet to surrogates 2-4.

The Level B surrogates also consult the hierarchy 500 and the group membership to determine which of the Level C surrogates should receive the packet. Although not shown explicitly, surrogate 5 is assigned to sub-switches 0:3, surrogate 6 is assigned to sub-switches 4:7, and so on. Thus, if sub-switch 1 is a member of the MC group, then Level C surrogate 5 would receive the packet and forward it to sub-switch 1.

In one embodiment, the surrogate sub-switches are chosen from among the possible destination sub-switches (i.e., Level D of the hierarchy). That is, the surrogate sub-switches may be one of the sub-switches 0:135. Further still, the surrogates may be selected from the group of sub-switches to which it is assigned. For example, surrogate 1 may be one of sub-switches in 0:35 while surrogate 5 may be one of the sub-switches in group 0:3, and so on. In another embodiment, however, the surrogates may be selected from sub-switches that are not in the group of sub-switches assigned to the surrogate.

Alternatively, the surrogate sub-switches may not be destination sub-switches. For example, the distributed switch may include sub-switches whose role is to solely serve as a surrogate for forwarding multicast traffic. Or, bridge elements or PCIe ports of the sub-switch that are not connected to any computing device—i.e., an ultimate destination of a multicast data frame—may be chosen as surrogates. Thus, even though one or more of the bridge elements on a sub-switch may be connected to a computing device, an unconnected bridge element on the sub-switch may be selected as a surrogate.

In one embodiment, the hierarchy may be specifically tailored for each sub-switch. That is, the Level A surrogates for one sub-switch may be different than the Level A surrogates for another sub-switch. This distributes the responsibility of forwarding packets among the different sub-switches. For example, the distributed switch may choose surrogates according to predefined rules such as a sub-switch can be only assigned as a surrogate for a maximum number of sub-switches, or a surrogate cannot be a Level A and 1 surrogate for the same sub-switch (to prevent looping). Based on the rules, the distributed switch may provide a customized hierarchy for each sub-switch or a group of sub-switches. In a distributed switch that uses customized hierarchies, the packet header may contain information, such as surrogate level and source ID, which enables each surrogate sub-switch to determine which of the hierarchies to use in order to forward the packet.

In one embodiment, a controller (e.g., an IOMC that is chosen as the master) on one of the sub-switches may be assigned to establish the one or more hierarchies. This controller may constantly monitor the fabric of the distributed switch to determine which computing devices are connected to the bridge elements of the different sub-switches. As the connections are changed, the controller may update the hierarchical data on each sub-switch. After the computing devices are attached to the different sub-switches (in any desired manner) and after the distributed switch is powered on, the controller can detect the current configuration, and generate one or more hierarchies. Moreover, if computing devices or sub-switches are removed or changed, or new ones are plugged in, the controller can dynamically detect these changes and generate new hierarchies based on the different configuration.

Figure 6:
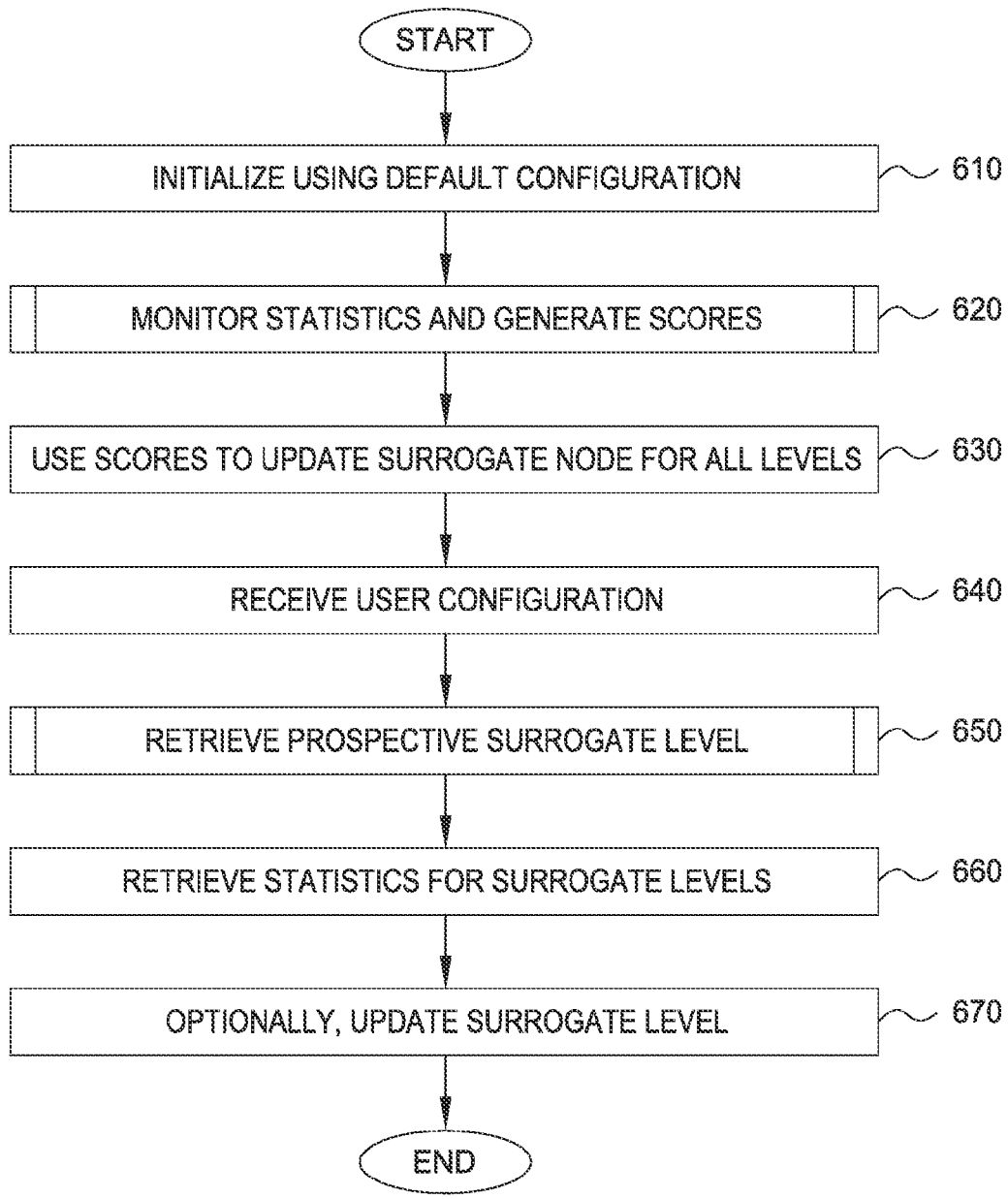
FIG. 6 is a flowchart illustrating a method for system guided surrogating control in broadcast and multicast, according to one embodiment disclosed herein.

FIG. 6 is a flowchart illustrating a method 600 for system guided surrogating control in broadcast and multicast, according to one embodiment disclosed herein. Generally, the steps of the method 600 are implemented to achieve optimal performance in the distributed switch by dynamically adjusting surrogate nodes (also referred to as sub-switches or switch elements) and surrogating levels based on monitoring network performance attributes and computed attribute scores. By executing the steps of the method 600, new surrogate nodes (and surrogating levels) may be selected based on the network performance attributes and computed attribute scores.

In one embodiment, the surrogate module 222 performs the steps of the method 600. At step 610, the surrogate module 222 initializes the distributed switch using a default configuration specifying default surrogate nodes. At step 620, described in greater detail with reference to FIG. 7, the surrogate module 222 begins monitoring statistics and computing attribute scores for each of the nodes in the distributed switch. A pool of candidate nodes may therefore be created, and the surrogate module 222 may select the candidate node with the best attribute score as the surrogate node. At step 630, the surrogate module 222 uses the computed attribute scores to dynamically adjust the surrogate node. The surrogate module 222 may distribute the updated surrogate node information, including any updated routing table and hierarchy information, throughout the distributed switch, such that all nodes are synchronized and using the same routing information. When a new surrogate is chosen, the distribution of the old surrogate is now assigned to the new surrogate, and the path for packets being forwarded is changed using the new surrogate information. The monitoring, scoring, and updating may be continuously performed such that the system performance is optimized at all times. A node whose surrogate status was removed may continue to operate in a normal fashion.

At step 640, a user may specify a surrogate level configuration. If the surrogate level configuration is not maintained and updated, system performance may suffer. As used herein, the surrogate level may be selected from levels 0, 1, 2, and 4, although any nomenclature may be used to describe the surrogate levels, which are distinct from the hierarchies described in FIG. 5. At level 4, surrogate nodes from all four levels (A, B, C, and D, as described in FIG. 5) may be used. At level 2, only two levels (B and D) may be used. At level 1, a single level (D) may be used. At level 0, no surrogates are used, as the local ports may be used to distribute packets to their destination. At step 650, described in greater detail with reference to FIG. 8, the surrogate module 222 may retrieve a prospective surrogate level. At step 660, the surrogate module 222 may retrieve statistics for the prospective surrogate level. This step may include monitoring the same attributes as in step 620, as well as computing the time required to transfer data packets to from a source to all destination ports using the prospective surrogate levels. In one embodiment, the statistics for two surrounding surrogate levels may be obtained. For example, if surrogate level x is selected, then the surrogate module 222 may retrieve statistics for levels x, x−1, and x+1. If any of these levels do not apply, they will not be analyzed. For example, when x=level 4, only level 2 will be analyzed. A transmission score indicative of performance may be computed for each surrogate level. If the score of one level exceeds the score of the current level, the surrogate module 222 may alter the surrogating level at step 670. Altering the surrogating level may comprise changing an entry in the MC group table containing the membership information on how frames are to be flooded or multicasted. Specifically, this information in the MC group table describes how many surrogates are used, and the waterfall effect of this use. In one embodiment, there is a register that holds the surrogate membership. In addition, there may be MC group table, which, as described above, holds the memberships of the ports within a domain. For a broadcast domain on a given VLAN, there is a MC group table entry for the specified VLAN that has port membership, so when the hardware floods a unicast frame into the VLAN, the hardware knows which ports to route (copy) the packet to. The MC group table entry contains the distribution method (the surrogates, if any), that it should use. The surrogating level is defined in the MC group table. Similarly, for a multicast, associated with a given MC group table address, there is a tree comprised of member ports in the multicast. When a frame needs to be multicast, the hardware will use the membership defined in the MC group table for the specified MAC address. The MC group table equally holds the surrogate schema (surrogate level) that should be used, using the "engines" defined in the surrogate register for the given task. At step 670, the surrogate module 222 may optionally update the surrogating level if the transmission score of the prospective surrogating levels exceeds the transmission score of the current surrogating level.

Figure 7:
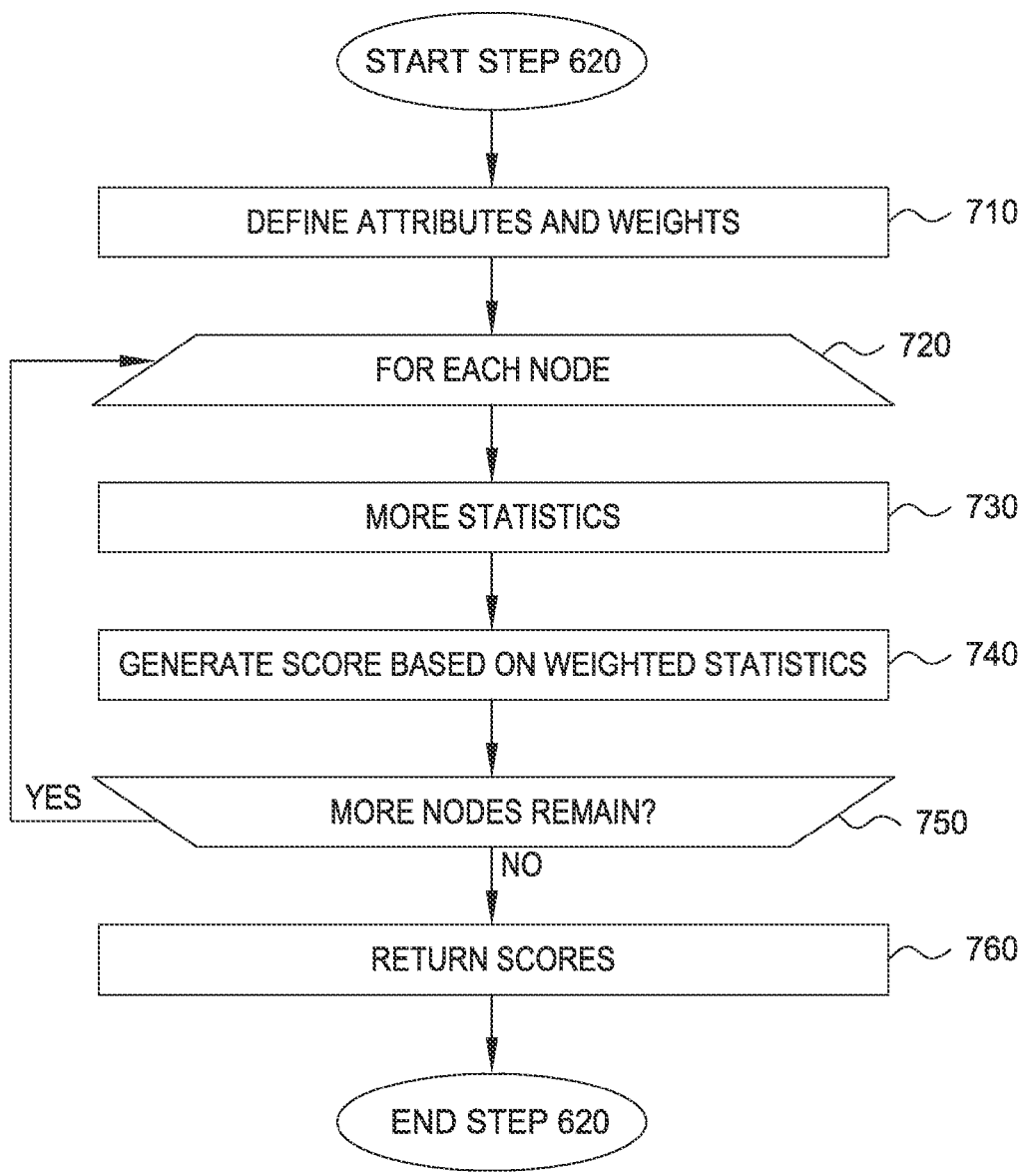
FIG. 7 is a flowchart illustrating a method for monitoring port statistics and generating scores, according to one embodiment disclosed herein.

FIG. 7 is a flowchart illustrating a method 700 corresponding to step 620 for monitoring nodes statistics and generating scores, according to one embodiment disclosed herein. The steps of the method 700 may be performed to compute attribute scores for each of the plurality of nodes in the distributed switch. In one embodiment, the surrogate module 222 performs the steps of the method 700. A respective surrogate module 222 may be executing on each node in the distributed switch, and the results may be synchronized by distributing the resultant information throughout the distributed switch. At step 710, the surrogate module 222 may define the attributes to be monitored, and their respective weights used in computing the attribute scores. The attributes may include any general network performance metric, for example wait time, throughput, and bandwidth. The attributes and weights may be default values defined by the surrogate module 222, or may be user-selected. The weights may place equal or unequal emphasis on the distinct attributes when computing the attribute score for each node. For example, throughput may be weighted 50%, while bandwidth and weight times may be weighted 25% each.

At step 720, the surrogate module 222 begins executing a loop including steps 730-750 for each node in the distributed switch. At step 730, the surrogate module 222 monitors the defined statistics for the node. At step 740, the surrogate module 222 computes an attribute score for the node using the predefined weights. At step 750, the surrogate module 222 determines whether more nodes remain to be monitored and scored. If more nodes remain, the surrogate module 222 returns to step 720. Otherwise, the surrogate module 222 proceeds to step 760. At step 760, the surrogate module 222 may return the set of scores, which it then may use to update the surrogate node, as described above. For example, the node with the highest attribute score may be dynamically chosen as the new surrogate node, and the information may be distributed to each switch element of the distributed switch.

Figure 8:
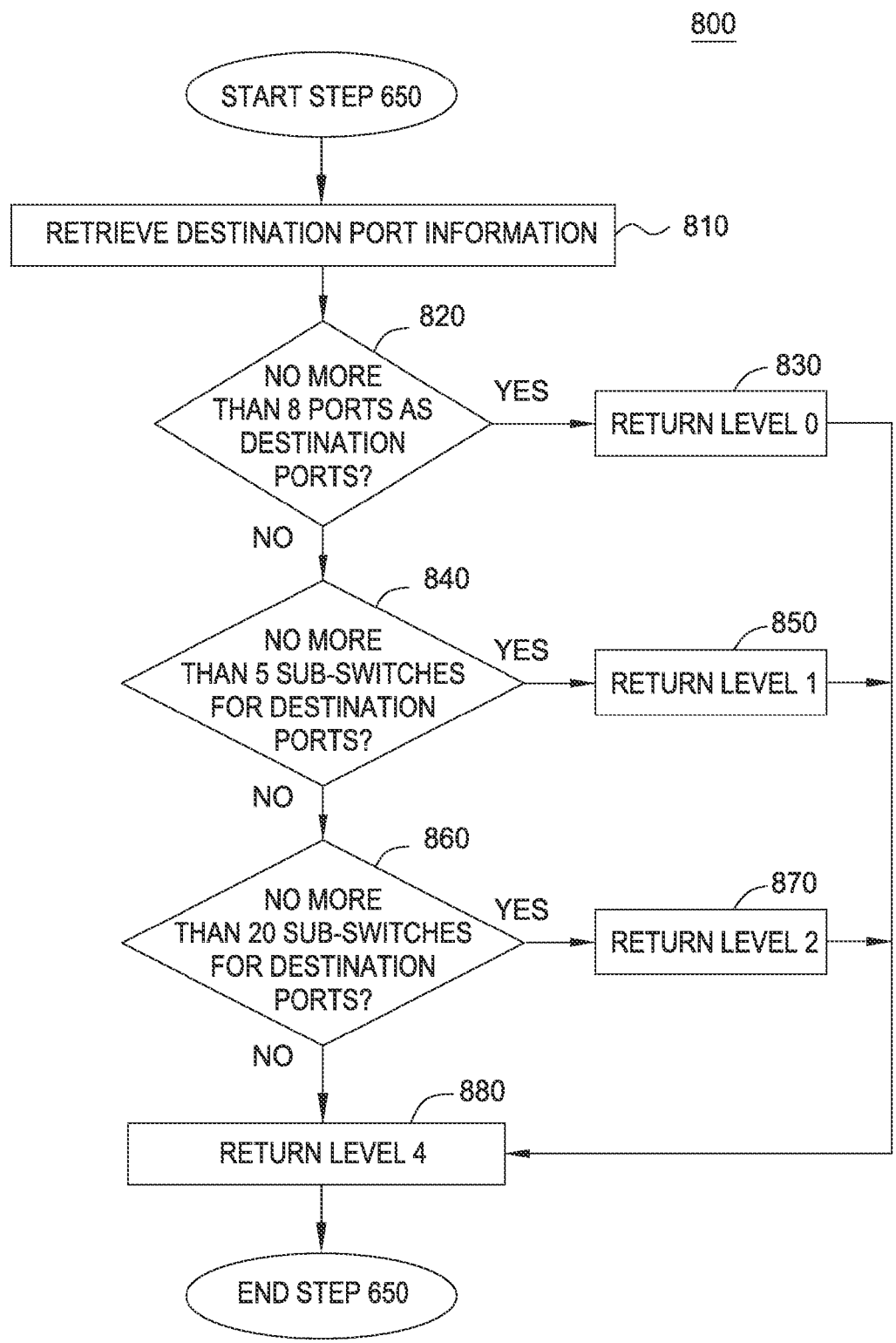
FIG. 8 is a flowchart illustrating a method for selecting a prospective surrogate level, according to one embodiment disclosed herein.

FIG. 8 is a flowchart illustrating a method 800 corresponding to step 650 for selecting a prospective surrogate level, according to one embodiment disclosed herein. Generally, selection of a prospective surrogate level may include determining how many levels of surrogates (surrogate nodes from levels A, B, C, and D of the hierarchy 500 in FIG. 5) must be used to distribute packets. As described above, at level 0, surrogating is not needed, and no surrogate nodes are selected. At level 1, a single level of surrogate nodes is selected, i.e., Level D in hierarchy 500. At level 2, two levels of surrogates nodes are selected, i.e., from Levels B and D of the hierarchy 500. At level 4, all four levels of surrogate nodes are needed, and nodes may be selected from Levels A, B, C, and D of the hierarchy 500. In one embodiment, the surrogate module 222 performs the steps of the method 800 to identify prospective surrogating levels, such that the surrogating levels may be updated to improve system performance.

At step 810, the surrogate module 222 may retrieve information related to the destination ports of a multicast data packet. The information may be entered by a user, or identified by the surrogate module 222. The information may include identifiers related to source ports, LAN/VLAN, and destination ports. At step 820, the surrogate module 222 determines whether the destination port information specifies no more than 8 destination ports. If more no more than 8 destination ports are identified, no surrogates are used (or needed to reach the destination ports), and the level 0 is returned at step 830. Otherwise, the surrogate module 222 proceeds to step 840. At step 840, the surrogate module 222 determines whether the destination port information returns more than 8 ports but no more than 5 sub-switches for the destination ports. If no more than 5 sub-switches are identified, the surrogate module 222 returns level 1 as the prospective surrogating level at step 850, as only a single level (Level D) of surrogate nodes from the surrogate hierarchy 500 are needed to distribute packets. Otherwise, the surrogate module 222 proceeds to step 860, where it determines whether more than 5 but no more than 20 sub-switches are identified for the destination ports. If no more than 20 sub-switches are identified, the surrogate module 222 proceeds to step 870, where it returns level 2 as the prospective surrogating level, and surrogate nodes from levels B and D of the hierarchy 500 may be selected. Otherwise, the surrogate module 222 returns level 4 as the prospective surrogating level, as surrogate nodes from all levels of the hierarchy 500. By combining this information with the gathered port attribute statistics, attribute scores, and transmission scores, the surrogate module 222 may determine the best surrogating level for the distribute switch, or a particular switch element of the distributed switch.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method to assist in distribution of packets between a plurality of switch elements in a distributed switch, the method comprising:

monitoring a first transmission path of a data frame from a first switch element to a first destination switch element, wherein the first transmission path includes a first surrogate switch element in a first level of a hierarchy, wherein the first transmission path is configured using a default hierarchy configuration that forwards a data frame to at least one of: (i) the first destination switch element and (ii) a second surrogate switch element, wherein the second surrogate switch element is in a second level of the hierarchy;

monitoring a second transmission path of the data frame from the first switch element to the first destination switch element using a second hierarchy configuration, wherein the second hierarchy configuration modifies the default hierarchy configuration and causes the first surrogate switch element to forward the data frame to at least a third surrogate switch element, wherein the third surrogate switch element is not in the first level of the hierarchy;

monitoring a third transmission path of the data frame from the first switch element to the first destination switch element using a third hierarchy configuration, wherein the third hierarchy configuration modifies the default hierarchy configuration and causes the first surrogate switch element to forward the data frame to at least a second destination switch element;

generating a first transmission score, a second transmission score, and a third transmission score, for the first transmission path, the second transmission path, and the third transmission path, respectively, wherein the respective transmission score is based on a time required to transmit the data frame using the respective transmission path and an attribute of each switch element in the respective transmission path; and upon determining that one of the second and the third transmission score exceeds the first transmission score, using the second or the third transmission path to transmit the data frame to the first destination switch element.

2. The method of claim 1, wherein the first, second, and third transmission scores are further based on: (i) a composite attribute score computed based on an attribute score of each switch element in the respective transmission path, (ii) a number of destination ports for the data frame, and (iii) a number of destination computing devices connected to the respective destination switch element.

3. The method of claim 2, further comprising:

upon determining that the attribute score of the first switch element is greater than the attribute score of the first surrogate switch element, designating the first switch element as the first surrogate switch element, wherein designating the first switch element as the surrogate switch element comprises updating a respective routing entry in a routing database, wherein using the respective transmission path to transmit the data frame comprises updating a surrogate hierarchy.

4. The method of claim 3, further comprising distributing the updated routing database to each of the plurality of switch elements.

5. The method of claim 1, wherein the attribute of each switch element comprises at least one of: (i) a waiting time for a plurality of data frames at the respective switch element, (ii) a throughput of the respective switch element, and (iii) a bandwidth of the respective switch element.

6. The method of claim 1, wherein a number of levels in the hierarchy is based on a number of destination ports for the data frame, wherein each level of the hierarchy comprises a respective subset of the plurality of switch elements, wherein the number of levels of the hierarchy is further based on a number of switch elements including the destination ports for the data frame, wherein the data frame is one of: (i) a multicast packet, and (ii) a broadcast packet.

* * * * *